No. 800,072. PATENTED SEPT. 19, 1905.
H. C. CHURCHMAN & F. R. LAY.
NEWSPAPER VENDING MACHINE.
APPLICATION FILED SEPT. 24, 1903.
2 SHEETS—SHEET 1.
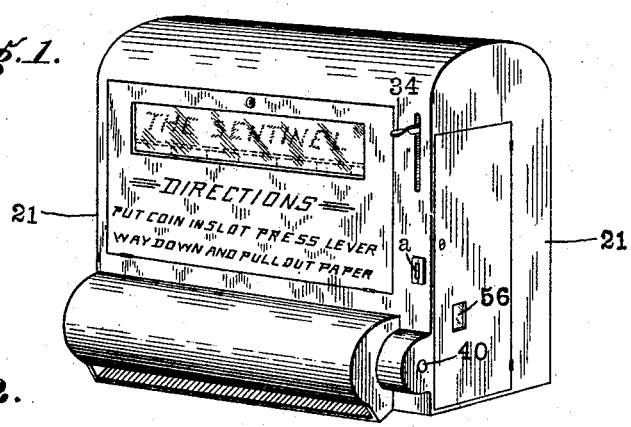
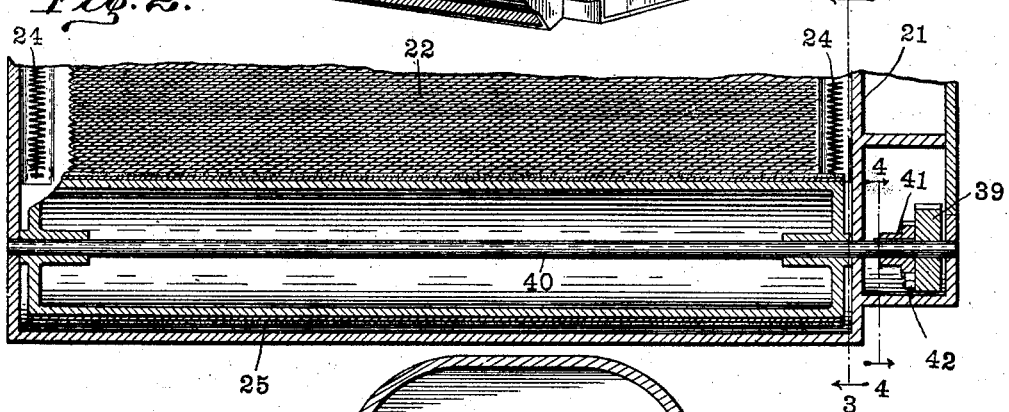
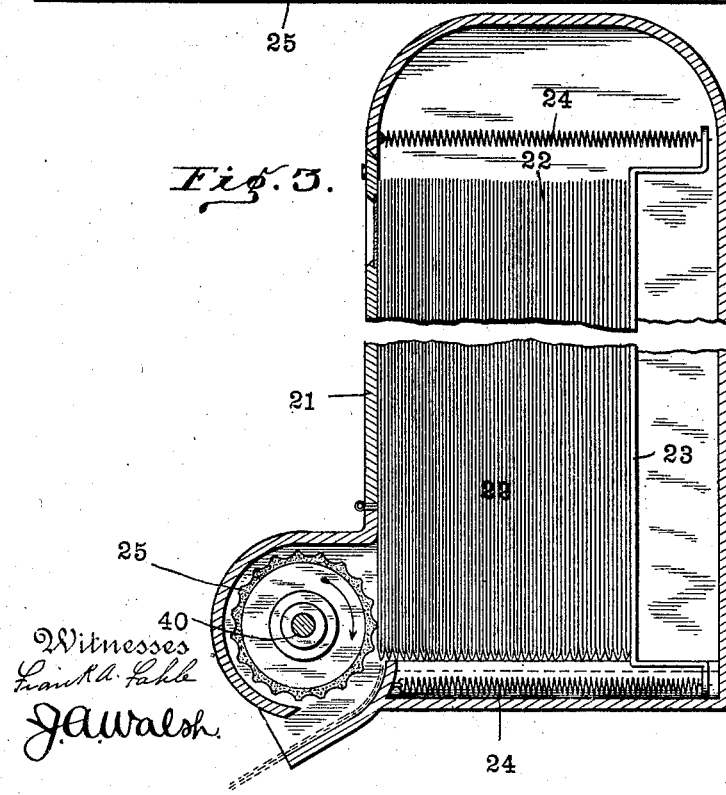
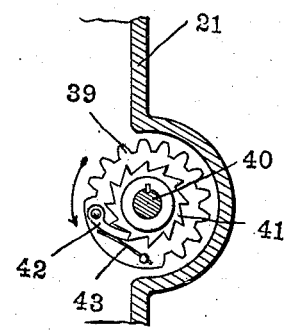
Witnesses
Frank A. Fahle
J. A. Walsh.
Inventors
Henry C. Churchman and
Frank R. Lay
By Bradford & Hood,
Attorneys.

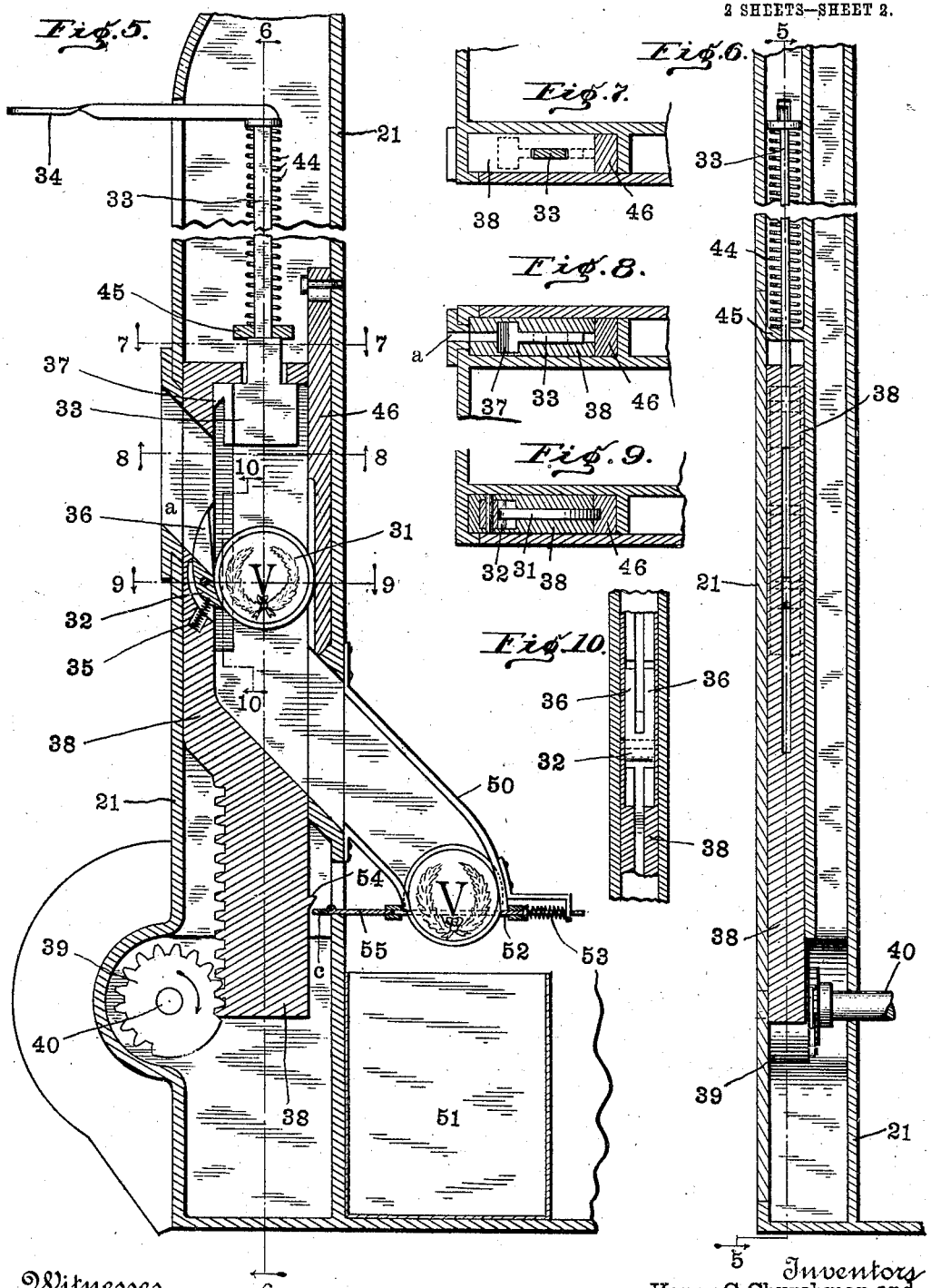

UNITED STATES PATENT OFFICE.

HENRY C. CHURCHMAN AND FRANK R. LAY, OF INDIANAPOLIS, INDIANA.

NEWSPAPER-VENDING MACHINE.

No. 800,072.   Specification of Letters Patent.   Patented Sept. 19, 1905.

Application filed September 24, 1903. Serial No. 174,434.

*To all whom it may concern:*

Be it known that we, HENRY C. CHURCHMAN and FRANK R. LAY, citizens of the United States, residing at Indianapolis, in the county of Marion and State of Indiana, have invented certain new and useful Improvements in Newspaper-Vending Machines, of which the following is a specification.

The object of our said invention is to provide an apparatus by means of which newspapers may be sold without newsboys or other salesmen; and it consists of an apparatus which can be operated by the purchaser by inserting the coin which is the price thereof into the machine containing them and then manipulating said machine, all as will be hereinafter more fully described and claimed.

Referring to the accompanying drawings, which are made a part hereof and on which similar reference characters indicate similar parts, Figure 1 is a perspective view of such a machine or apparatus; Fig. 2, a horizontal sectional view through the delivering-roller thereof and immediately-adjacent parts on an enlarged scale; Fig. 3, a vertical sectional view taken near one end of the apparatus at the point indicated by the dotted line 3 3 in Fig. 2; Fig. 4, a detail sectional view showing the ratchet-and-pawl arrangement as seen from the point indicated by the dotted line 4 4 in Fig. 2; Fig. 5, a detail vertical sectional view through the operating mechanism of the machine as seen from the dotted line 5 5 in Fig. 6; Fig. 6, a vertical sectional view as seen when looking in the direction indicated by the arrows from the dotted line 6 6 in Fig. 5; Figs. 7, 8, and 9, transverse sectional views as seen in the directions indicated by the arrows when looking from the positions indicated by the dotted lines 7 7, 8 8, and 9 9, respectively, in Fig. 5; and Fig. 10, a detail vertical sectional view as seen when looking in the direction indicated by the arrows from the dotted line 10 10 in Fig. 5.

Within a suitable casing 21 we place the desired number of newspapers 22, and behind said newspapers we arrange a backing-plate 23, which is urged forward against the papers by means of several tension-springs 24. We show four of these springs, one at each corner of the structure. The friction incident to this arrangement is sufficient to hold the papers in place until they are removed in the manner hereinafter stated, but is not sufficient to prevent the friction-roller from operating to draw them one by one to a point where they can be removed from the apparatus. Directly in front of the ends of the folded papers as placed in the apparatus we arrange a friction-roller 25, which when revolved will pull the paper against which it rests down to a point where it can be reached by the purchaser and pulled out, as indicated by the dotted lines in Fig. 3. This roller, however, cannot be operated until the required coin is introduced, as will now be explained.

Referring now especially to Fig. 5, it will be seen that a coin 31 may be introduced through a suitable aperture *a* in the face of the machine. This coin when first introduced is held from further progress by the lower end of the detent 32, between the upper forked points of which it has passed. After the coin has reached this position a plunger 33 is operated by pressing downwardly upon the arm 34, and the first operation of said plunger after it comes in contact with the coin is to swing the detent 32 on its pivot, compressing the spring 35, by which it is held, out to the position indicated in Fig. 5, thus swinging the upper points 36 thereof, which constitute a suitable pawl, to below the corresponding catch-points 37 of the plunger 33. This pawl-and-detent structure is pivoted to a rack-bar 38, which engages with a gear 39, which is loosely mounted on the shaft 40 of the roll 25.

Referring now to Fig. 4, a ratchet 41 is shown as rigidly mounted on the shaft 40, and a pawl 42 is shown as pivotally mounted on the gear 39 and is held against said pawl by a small spring 43. The result is that as the rack-bar 38 is pushed down it operates, through the gear 39, the ratchet 41, and pawl 42, to rotate the shaft 40 and with it the friction-roll 25, and thus operates to push a paper out into the position indicated by the dotted lines in Fig. 3. As the rack-bar returns, however, the pawl 42 slips over the teeth of the ratchet 41, and therefore the friction-roll 25 is only rotated in one direction. As shown in Fig. 5, the lower end of the push-bar 33 is formed to engage with the upper end of the structure, which includes the rack-bar 38, so that it is drawn up as the push-bar ascends. The push-bar itself is caused to rise when the hand-pressure is removed from the arm 34 by the spring 44, which is coiled about the stem of said push-bar and rests on the cross-bar 45 of the frame at its lower end and against a collar on said stem at its upper end. The push-bar, however, as will be readily understood, moves downwardly (through the open ing in said structure 38 provided therefor) until it comes in contact with the coin and thereafter with the pivoted pawl 36. As it is necessary for the pawl 36 to be centrally divided, so as to form part of the slot through which the coin is introduced into the machine, it is also necessary for the lower end of the plunger to be widened somewhat at the point where it engages with said pawl. This construction is clearly indicated in the drawings, especially Fig. 8.

In order to adapt our machine to general use, so that it may be employed in the vending of papers of various prices, we make the part 46, against which the coin rests when first introduced, shiftable. This may be done in various ways. We have shown it as provided with a groove in one face and have shown the grooved face in use and have shown the machine arranged when in this condition for a five-cent piece or "nickel." By simply detaching this part 46 and turning it around so that the flat instead of the grooved side will come in contact with the coin the opening is reduced, so that the machine is suitable for a paper the price of which is one cent. Similarly this piece can be made of such a size as to be turned and use its other sides for coins of other sizes. The particular construction and arrangement is immaterial so long as the part is shiftable, as stated. The coins are finally delivered into a receptacle 51. It is desirable, however, in order that the correct operation of the machine may at all times be apparent to hold each coin last introduced in suspension after the delivery of the paper to the vendee until the next coin has been introduced and the machine started on a new operation. To reach this result, we put at the bottom of the coin-chute 50, just above the receptacle 51, a transversely-moving slide 52, containing a slot through which the coin will just pass, and place behind this slide a spring 53, by which it is normally held forward to a point which reduces the opening sufficiently so that the coin will be held suspended until the slide is pushed back. We provide a cam projection 54 on the rack-bar 38 and extend an arm 55 out from the slide 52 into the path of this cam. The result is when the rack-bar 38 is pushed down it operates first to push back the slide 52 and allow the coin, suspended in the manner stated, to drop into the receptacle 51. After the cam 54 passes, the slide, actuated by the spring 53, immediately flies back so as to stop the coin which at that same instant is released. A small window 56 (see Fig. 1) is provided, through which the coin in suspension may be seen. The contacting end c of the arm 55 is secured to the main part by a "rule-joint" hinge, so that as the rack-bar 38 rises it will not operate the slide 52, but only move it when said rack-bar descends.

Having thus fully described our said invention, what we claim as new, and desire to secure by Letters Patent, is—

1. The combination, in a newspaper-vending machine, of means whereby the papers are held toward the delivery side of the apparatus, means for moving the papers one by one into the delivery-mouth of the apparatus, a reciprocating rack-bar for operating said means, a slide extending from the outside of the apparatus through said rack-bar structure through which a coin may be introduced, a combined detent and pawl for holding said coin when first introduced, and a plunger which first operates to push said coin down and tip said pawl and detent on its pivot and afterward engages with said pawl and detent and then forces the rack-bar down, operating the device and delivering the paper.

2. The combination, in a newspaper-vending machine, of means for holding the papers, means for moving the papers out, and mechanism for actuating said moving means, comprising a reciprocating rack-bar, a combined pawl-and-detent structure pivoted thereto the detent end whereof projects into the path of the coin by means of which the machine is operated, and a plunger which first engages with the coin and through it swings said pawl-and-detent structure on its pivot and throws its pawl end into the path of the descending plunger whereby the reciprocating rack-bar and the plunger are thereafter caused to travel in unison.

3. The combination, in the operating mechanism of a newspaper-vending machine, of a reciprocating bar arranged adjacent to the aperture through which the coin is to be introduced and having a portion of said aperture formed therein, a combined pawl-and-detent structure mounted in said reciprocating rack-bar and having its upper end slitted to also form a part of said aperture, a spring by means of which said pawl-and-detent structure is normally held into the path of the coin after the same is introduced into the machine through said aperture, and a plunger which operates first upon the coin to swing said pawl-and-detent structure into its own path and then through said structure is enabled to cause said rack-bar to move in unison therewith.

4. A coin-controlled operating means comprising a reciprocating bar, a slide extending from the outside of the apparatus through said bar structure through which a coin may be introduced, a combined detent and pawl for holding said coin when first introduced, and a plunger which first operates to push said coin and tip said pawl and detent on its pivot, and afterward engages with said pawl and detent and moves the bar, for the purpose set forth.

5. A coin-controlled operating means comprising a reciprocating bar, a combined pawl-and-detent structure pivoted thereto, the detent end whereof projects into the path of the coin, and a plunger which first engages with the coin and through it swings said pawl-and-detent structure on its pivot and throws its pawl end into the path of the descending plunger whereby the reciprocating bar and the plunger are thereafter caused to travel in unison.

6. A coin-controlled operating means comprising a reciprocating bar arranged adjacent an aperture through which the coin is to be introduced and having a portion of said aperture formed therein, a combined pawl-and-detent structure mounted in said reciprocating bar, and having its upper end slit to also form a part of said aperture, a spring by means of which said pawl-and-detent structure is normally held into the path of the coin after the same is introduced into the machine through said aperture, and a plunger which operates first upon the coin to swing said pawl-and-detent structure into its own path, and then through said structure is enabled to cause said bar to move in unison therewith.

In witness whereof we have hereunto set our hands and seals, at Indianapolis, Indiana, this 21st day of September, A. D. 1903.

HENRY C. CHURCHMAN. [L. S.]
   FRANK R. LAY. [L. S.]

Witnesses:
 ARTHUR M. HOOD,
 JAMES A. WALSH.